United States Patent [19]

Linker et al.

[11] Patent Number: 4,575,003
[45] Date of Patent: Mar. 11, 1986

[54] FLUID HEATING ATTACHMENT FOR AUTOMOBILE ENGINE COOLING SYSTEMS

[75] Inventors: Roy E. Linker; Matthew P. Linker, both of Titusville, N.J.

[73] Assignee: Hotshot Auto Products Inc., Pennington, N.J.

[21] Appl. No.: 609,051

[22] Filed: May 10, 1984

[51] Int. Cl.<sup>4</sup> ............................................. B60H 1/02
[52] U.S. Cl. .................. 237/12.3 R; 219/205; 165/41; 126/350 A
[58] Field of Search .................. 237/12.3 R; 219/205, 219/202, 203; 165/41; 15/250.04, 250.05; 126/350 A

[56] References Cited

U.S. PATENT DOCUMENTS

| | | |
|---|---|---|
| 2,721,544 | 10/1955 | Kimberlin .......................... 219/205 |
| 2,947,020 | 8/1960 | Wilfert et al. . |
| 3,243,119 | 3/1966 | Merkle . |
| 3,417,920 | 12/1968 | Tyson . |
| 3,632,042 | 1/1972 | Goulish . |
| 3,716,886 | 2/1973 | Klomp . |
| 3,738,252 | 6/1973 | Cardinale . |
| 3,888,412 | 6/1975 | Lindo . |
| 4,090,668 | 5/1978 | Kochenour . |
| 4,145,788 | 3/1979 | Ferrarelli . |
| 4,354,548 | 10/1982 | Carlsson . |

FOREIGN PATENT DOCUMENTS

| | | | |
|---|---|---|---|
| 57-5348 | 1/1982 | Japan ............................. | 237/12.3 R |
| 383513 | 11/1932 | United Kingdom ........... | 126/350 A |

*Primary Examiner*—Henry Bennett
*Attorney, Agent, or Firm*—Sperry, Zoda & Kane

[57] ABSTRACT

A device connectable in the cooling system of an automobile engine includes a heating chamber through which the engine coolant flows, and which includes a tubular heating coil. The coil is connected between the windshield washer fluid reservoir and the windshield washer nozzle or nozzles of the vehicle. Windshield washer liquid flowing through the coil is warmed by heat exchange with hot engine coolant flowing through the chamber in which the coil is mounted. In a modified arrangement, the device incorporates a second function, in that the chamber is enlarged to include, in addition to the windshield washer fluid heating coil, an electrical heating element which can be connected to house current while the vehicle is parked with its engine not running. The engine coolant is thus heated to keep the engine warm during cold weather by thermal circulation.

3 Claims, 8 Drawing Figures

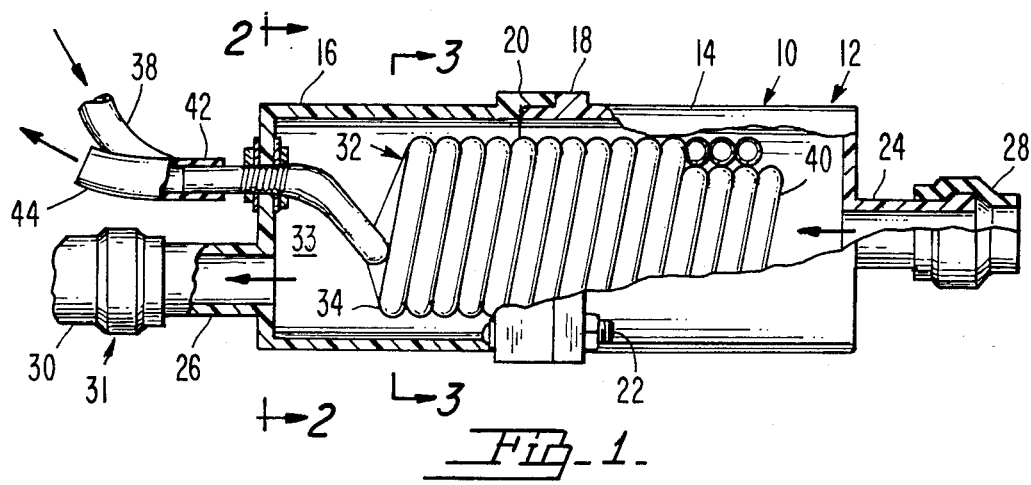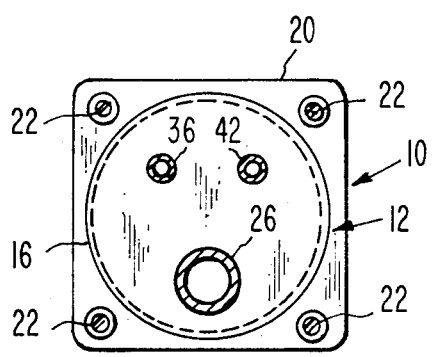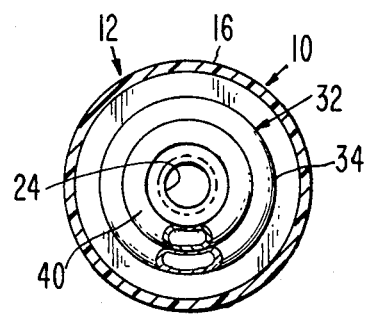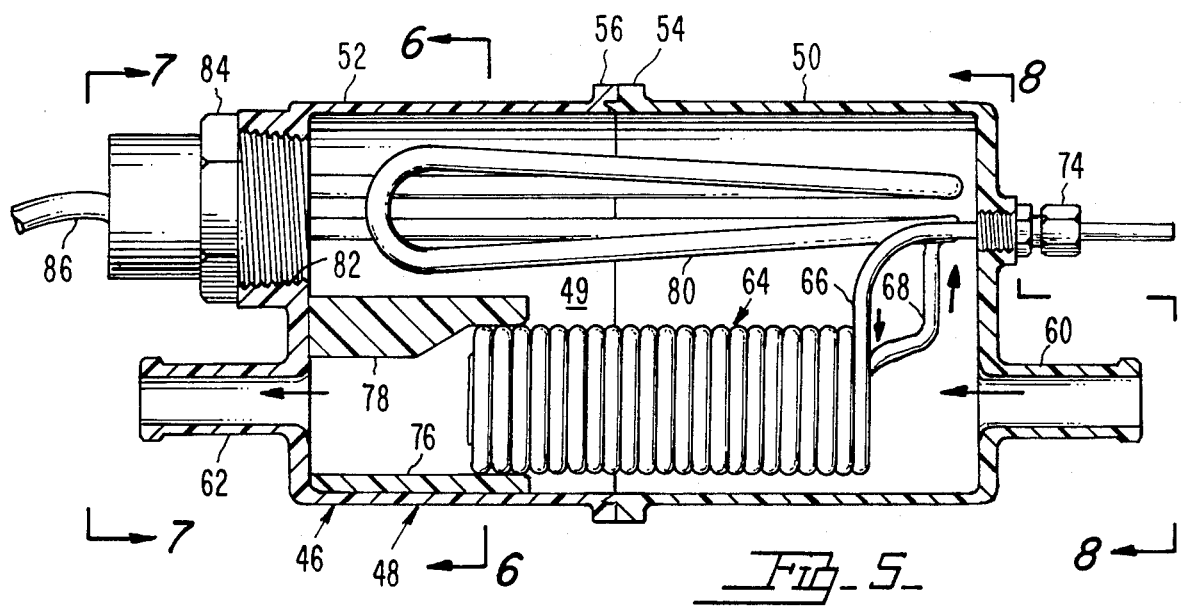

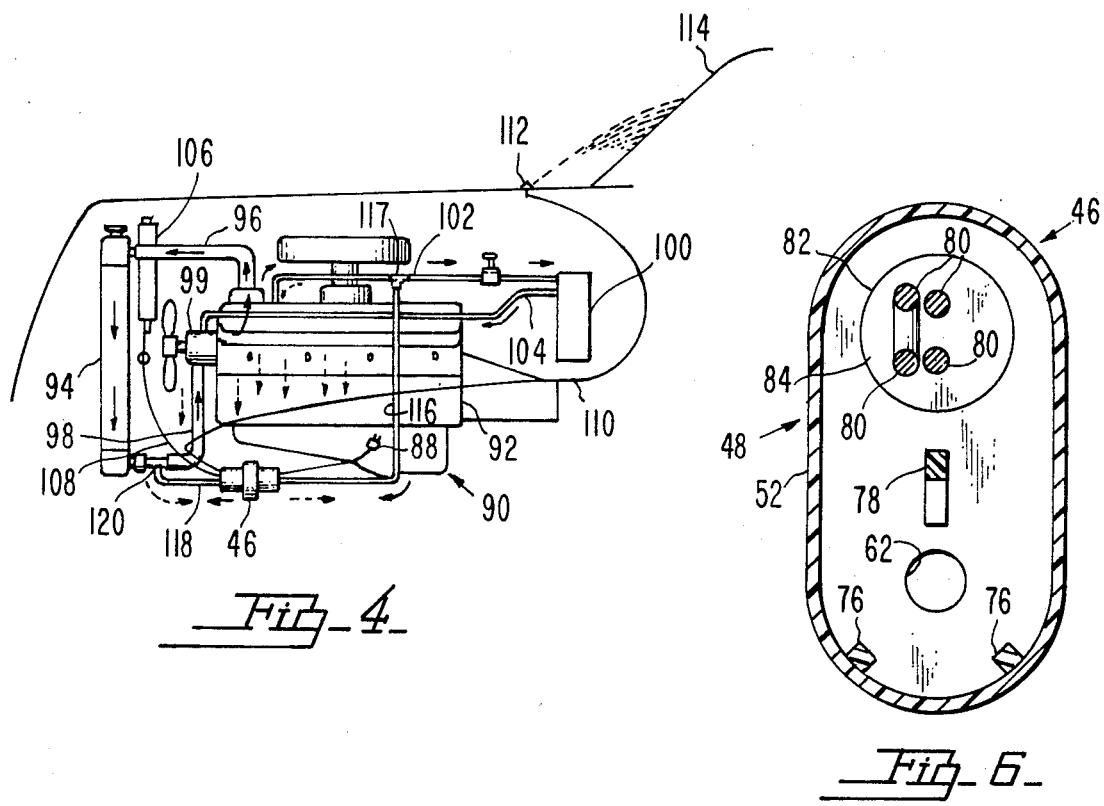
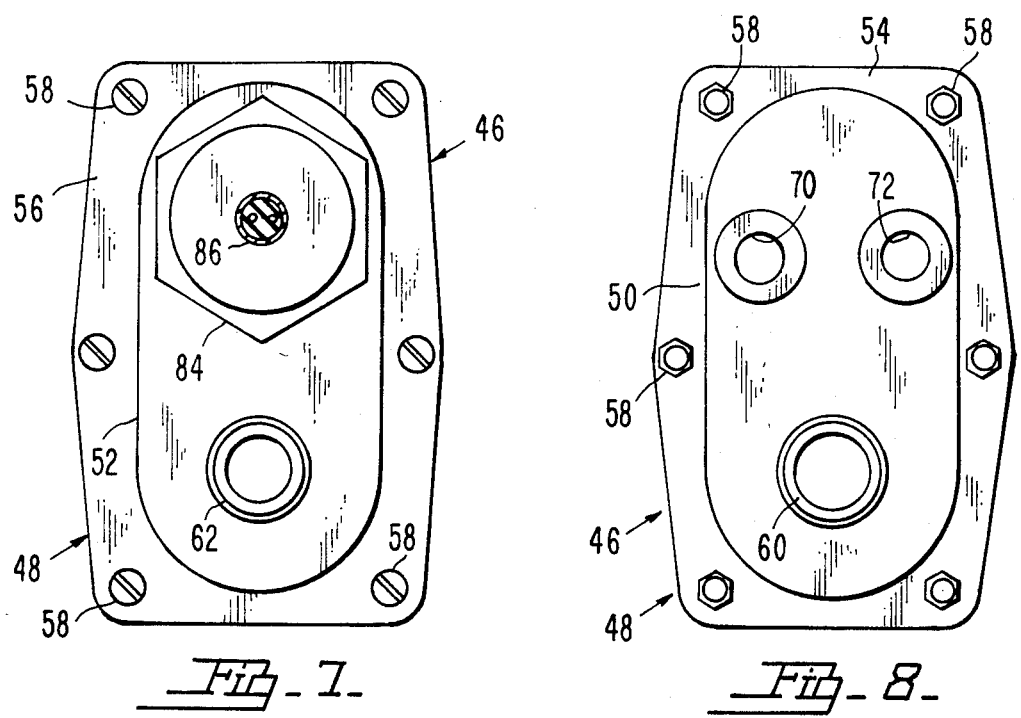

FLUID HEATING ATTACHMENT FOR AUTOMOBILE ENGINE COOLING SYSTEMS

BACKGROUND OF THE INVENTION

1. Field Of The Invention

The present invention relates generally to heating devices, and in a more particular sense relates to a heating device connectable in the cooling system of an automobile engine, to provide means for heating windshield washer fluid so that it will melt ice or snow build-up on the windshield wipers or on the windshield itself. The device also facilitates removal of dirt, sap, and insects from the windshield in summer or in warm weather areas. The invention provides such means and/or additional means that will heat the engine coolant while the vehicle is parked with the engine not running, thus keeping the engine warm during cold weather.

2. Description Of The Prior Art

Those who are the owners of automotive vehicles in climates where the vehicles are exposed to cold climatic conditions have great difficulty in keeping windshields and wipers free of ice and snow build-up during storms, and also in removing frost before starting in mornings. Although the fluid, while in the reservoir awaiting use, is prevented from freezing by the admixture of antifreeze therewith, dispersal of the fluid into spray droplets when forced under pressure from the windshield washer spray nozzle, results in maximum exposure thereof to the cold air and to the cold surface of the windshield. The result is that when air temperatures are well below freezing, the vehicle operator is often effectively prevented from cleaning a dirty windshield. Although a windshield splattered with dirt and mud produces dangerous highway driving conditions, especially at night, it is even more dangerous to suddenly find oneself attempting to look through a film of ice formed on the windshield. Obviously both conditions are to be avoided wherever possible.

Heretofore, it has been proposed to heat windshield washer fluid to a temperature high enough to cause it to withstand freezing when sprayed upon the windshield. However, in most instances the devices of the prior art have been complicated, difficult to install and in many instances are not thought to be as totally efficient as one would hope for in a product of this type.

Another, vexing problem encountered by automobile owners in cold climates stems from the fact that particularly when the vehicle is parked outside overnight in sub-freezing temperatures, the engine becomes very cold, making it difficult to start and also requiring strain on the starting system and excessive time for the engine to warm up. Accordingly, engine heaters, including heaters that are connectable to ordinary house current, have been devised, and have met with some success. A well-known type of heater is that which heats the dipstick, whereby to keep the engine oil in a relatively warm condition. Under these circumstances, the engine lubricant does not thicken excessively under adverse, freezing climatic conditions. The engine may thus be started more easily, and with less strain on the moving parts thereof than would be true if an engine heater were not used.

So far as is known, it has not been heretofore suggested, with respect to windshield washer heaters alone, that the heating coil through which the washer fluid passes be immersed in a chamber through which the engine coolant flows, in a manner calculated to provide instant and maximum heat exchange between the coolant and washer fluid.

Also, so far as is known, it has not been previously suggested to combine, in a single, easily installed, relatively inexpensive device, both an engine heater and a windshield washer fluid heater, connectable in the engine cooling system without anything more than the requirement of cutting one of the coolant flow hoses and connecting the device between the cut ends; and cutting the line from the windshield washer reservoir to the spray nozzle, and attaching the cut ends to the ends of the washer fluid heating coil.

SUMMARY OF THE INVENTION

Summarized briefly, in one form of the invention, the heating device is used only for the purpose of heating the windshield washer fluid. In this basic, simplest form of the invention, there is provided a cylindrical heating chamber, having exteriorly projecting inlet and outlet fittings communicating directly with the interior of the chamber or housing. A coolant flow hose of the engine cooling system can be cut, and the cut ends can then be swiftly applied to the inlet and outlet fittings. As a result, the engine coolant will flow through and will fill the chamber when the engine is running. The chamber thus becomes, in effect, part of the coolant system of the vehicle engine. Hot engine coolant will thus be pumped continuously through the chamber while the engine is running. Preferably, the device is connected in the hose extending to the vehicle heater. It is in this flow path that the engine coolant is first heated.

To complete the installation, a line from the windshield washer reservoir to the washer nozzle is also cut. A tubular coil, of a material that will promote rapid heat exchange, is immersed in the coolant passing through the chamber, and has an inlet and outlet projecting outside of the chamber or housing for connection to the cut ends of the washer fluid line. Thus, almost immediately after the vehicle engine begins to operate, there is a rapid heat exchange between the engine coolant and the washer fluid confined in the coil. This permits operation of the windshield washer almost immediately after the engine starts running.

In a second form of the invention, the chamber is enlarged to include, additionally, an electric resistance element. This is connectable to ordinary house current. Accordingly, when the vehicle is parked outside in sub-freezing temperatures, the heating element will heat the coolant in which it is immersed within the chamber. This will set up a flow of engine coolant by thermal circulation, with heated fluid rising to the top of the engine block, and flowing downwardly therethrough by changes in fluid weight by heating action as it cools. In this form of the invention, thus, instant warm operation of the windshield washer in temperatures well below freezing is permitted even before the engine coolant is heated by running of the vehicle engine.

BRIEF DESCRIPTION OF THE DRAWINGS

While the invention is particularly pointed out and distinctly claimed in the concluding portions herein, a preferred embodiment is set forth in the following detailed description which may be best understood when read in connection with the accompanying drawings, in which:

FIG. 1 is a view of one form of the invention, partly in longitudinal section and partly in side elevation, portions of associated coolant and washer fluid hoses being broken away;

FIG. 2 is a transverse sectional view substantially on line 2—2 of FIG. 1;

FIG. 3 is a transverse sectional view through the interior of the housing, substantially on line 3—3 of FIG. 1;

FIG. 4 is a view, on a reduced scale, of a typical automobile engine and its associated cooling system, showing a second form of the invention used for heating both the windshield washer fluid and also for heating the engine coolant while the vehicle engine is not running;

FIG. 5 is a longitudinal sectional view through the modified form of the invention shown in FIG. 4;

FIG. 6 is a transverse sectional view through the housing of the form of the invention shown in FIG. 5, taken substantially on line 6—6 of FIG. 5;

FIG. 7 is an end elevational view of the device shown in FIG. 5, as seen from line 7—7 of FIG. 5; and FIG. 8 is an end elevational view of the FIG. 5 form of the invention, as seen from line 8—8 of FIG. 5.

DETAILED DESCRIPTION OF THE PREFERRED EMBODIMENTS

One form of the present invention is shown in FIGS. 1-3. In this form, the device is limited to the heating of windshield washer fluid. The device has been generally designated by the reference numeral 10, and comprises an elongated, hollow, cylindrical housing 12 preferably formed of molded plastic sections 14, 16 having interfitting connecting flanges 18, 20 forming a lap joint between the sections. The flanges (see FIG. 2) project outwardly in face-to-face relation, and have registering openings receiving screws, bolts 22 or equivalent fasteners, or by spin-welding, solder, cement, or any other connecting means adapted for forming a liquid-tight joint between the sections. If necessary to provide maximum assurance against leakage, a suitable sealing gasket, not shown, can be provided in the joint between the housing sections.

Sections 14, 16 have integral outer end walls, formed with exteriorly projecting coolant inlet and outlet fittings 24, 26 respectively adapted for liquid-tight connection to the cut ends 28, 30, respectively, of the hose 31 that extends to the passenger compartment space heater of the vehicle.

Within the housing, a tubular washer fluid heating coil 32 is completely immersed in coolant flowing through and filling the coolant chamber 33 defined by the hollow housing 10. The coil is preferably of a material that promotes rapid heat exchange, such as copper, and in the illustrated embodiment includes an outer coil section 34 having an inlet end 36 (FIG. 2) that projects through the end wall or walls of housing sections 16 for connection to one cut end of the windshield washer fluid supply line 38 extending from the windshield washer reservoir.

Within chamber 33, outer coil section 34 merges into an inner coil section 40 having an outlet end 42 extending through the end wall of housing section 16, for connection to fluid washer supply line 44 extending to the windshield washer spray nozzle.

In use of this form of the invention, in order to install the device one simply cuts the coolant heater hose supply line 31, to provide cut ends 28, 30 which are then sealably engaged with the inlet and outlet fittings 24, 26. As a result, when the engine is running, the engine coolant flows through the chamber 33 continuously, and by heat exchange heats the windshield washer fluid confined within the elongated series of outer and inner coils of the washer fluid heating coil 32.

In this part of the cooling system, there will be rapid heating, typically. Most modern-day automobile engines prevent circulation of the coolant through the engine radiator for a period of time by thermostatic valve action after the engine begins to run. Instead, initially there is only limited circulation, this being through the portion of the coolant flow system that extends from the engine block to the passenger compartment heater.

Accordingly, heated windshield washer fluid is available as soon as the engine coolant begins to heat in the space heater supply hose.

It is important to note that the total length of the tubing that comprises the immersed outer and inner coil sections 34, 40 is quite great, and thus is adapted to hold a substantial quantity of windshield washer fluid in a static, quiescent state. Accordingly, should one find it necessary to apply windshield washer fluid to the windshield, an ample supply of said fluid is immediately available, warmed to an extent that will assure effective use when ejected from the washer spray head.

Between uses of the windshield washer, the washer fluid in the line extending from the washer reservoir to the spray head, and particularly in the coil 32, reverts to a quiescent state, so that once again, it will be fully heated as the vehicle engine continues to run and hot coolant is, as a result, continuously pumped through the chamber 33 in which the coil 32 is fully immersed.

In the form of the invention shown in FIGS. 4-8, the invention has been generally designated 46. Referring to FIGS. 5-8, it includes a hollow housing 48 defining a heating coil immersion chamber 49 formed by interfitted housing sections 50, 52 having confronting flanges 54, 56 sealably joined by suitable fastenings such as screws or bolts 58 (FIG. 7).

At opposite ends of the housing there are provided a coolant inlet 60 and a coolant outlet 62. Within chamber 49, a tubular windshield washer fluid heating coil 64 has an outer and an inner series of coils similar to the arrangement shown in FIG. 1, with the outer coil having an inlet 66 through which washer fluid flows into the coil, said fluid passing through the outer and inner coil sections and exiting through a washer fluid outlet 68. The inlet and outlet 66, 68, respectively extend through mounting openings 70, 72 (see FIG. 8), and are sealably engaged therein by connecting fittings 74.

Within chamber 49 (see FIGS. 5 and 6), there is provided a means for stably supporting the heating coil 64 in a position in which it will be fully immersed in the coolant flowing through the chamber 49. To this end there is provided, at one end of the housing, angularly spaced ribs 76, which can be molded integrally with the housing section 52 or otherwise fixedly secured thereto. Opposing the ribs 76 is a projecting support rib or coil support bar 78. The coil means 64 is inserted in the space circumscribed by the support ribs 76, 78, so as to assure that it will be stationarily mounted in spaced relation to the wall of the housing, where there will be maximum contact of the coil means 64 with the engine coolant flowing through the housing.

Within chamber 49, above the washer fluid heating coil 64, there is provided an electrical resistance-type heating element 80. Above the coolant outlet 62 (see FIGS. 5 and 6), a large, threaded opening 82 is formed in the housing section 52, receiving the threaded base 84 of the heating element. The heating element and its base are known, per se, and include as part of the total assembly an electrical cord 86, terminating in a male plug 88 (see FIG. 4), adapted to be engaged in a grounded type convenience outlet, not shown, that typically would be part of an ordinary 120 volt AC electrical system such as found in the ordinary residence or commercial establishment.

The device shown in FIGS. 5–8 has been illustrated in a typical installation, in FIG. 4. Depicted in FIG. 4 is a typical water-cooled automobile engine 90, having block 92 through which coolant is circulated. Adjacent the block is the radiator 94, to which there extends a radiator inlet hose 96 that extends to the radiator from the upper end of the block. At the lower end of the radiator, radiator outlet hose 98 extends to the water pump 99. At 100, there has been designated the vehicle passenger space heater, supplied with heated, circulating fluid by means of a space heater supply hose 102 through which the coolant is pumped to pass through the heater 100, said fluid exiting the heater through return hose 104 extending to the suction side of the pump 99. A windshield washer fluid reservoir 106 has a line 108 connected in communication with the washer fluid heating coil inlet 66. Connected to the coil outlet 68 is a washer fluid supply line 110 extending to the washer spray head 112 through which washer fluid is directed against windshield 114.

To install the modified form of the invention, a connecting hose 116 is provided, which is connected in communication with the heater supply hose 102 by means of a T-fitting 117. Hose 116, at its other end, is connected to the inlet fitting 60.

A connecting hose 118, at one end, is connected to the outlet 62. At its other end, hose 118 is connected between the lower end of radiator 94 and the radiator outlet hose 98, by means of a T-fitting 120.

In this form of the invention, the device serves a dual function, in that it comprises both an engine heater and a windshield washer fluid heater as distinguished from the first form, in which the device serves the single function of heating the windshield washer fluid.

Assuming that the vehicle must be parked overnight, in sub-freezing temperatures adjacent the owner's home, one plugs in the cord 86, into the house current of the dwelling. As a result, heating element 80 is energized. The element 80 remains in an energized condition throughout the time that the vehicle is parked with the engine not running. As a result, the coolant filling the chamber 49 is heated, to a point below the thermostat rating. This causes flow of the coolant by thermal circulation, along paths indicated by the dotted flow arrows in FIG. 4. One sees that the heated coolant will exit the chamber 49, through outlet 62, rising by thermal circulation within the hose 116 and thereafter flowing downwardly, through hose 102, into the upper end of the engine block. As the warmed coolant begins to cool, it gravitates as shown by the dotted arrows, through the engine block, to the bottom of the block. This displaces already cooled fluid in the block, causing said fluid to be forced upwardly, so that it will exit the block through the radiator outlet hose 98, returning to the chamber through the T-fitting 120 and hose 118 for re-heating. In this way, as long as the electrical heating element 80 is energized, with the engine not running, there will be a continuous circulation of coolant through the engine block, by thermal circulation, keeping the block and its associated engine components and engine lubricant in a heated state.

When the vehicle is to be operated, plug 88 is disengaged from the convenience outlet, and on starting of the engine it will be already sufficiently warmed up to permit operation of the vehicle without the usual problems resulting from operation of a vehicle with a cold engine.

Meanwhile, the windshield washer fluid is heated in the same manner as in the first form of the invention, that is, when the engine is started, coolant will now flow in the direction shown by the solid arrows in FIG. 4. At this time, when the engine is initially started, water pump 99 will pump coolant immediately into the space heater supply hose 102. This circulates coolant not only through the heater 100 but also, pumps coolant downwardly through line 116 and through inlet 60, causing the coolant to pass through chamber 49 into hose 118 and thereafter return to the pump through hose 98. After a time, of course, the entire coolant circulating system goes into operation, but at least initially, there is a hot supply of coolant continuously passing through the chamber 49, to heat the washer fluid in the coil means 64. This permits operation of the windshield washer with a minimum of delay.

It is a desirable characteristic of the form of the invention shown in FIGS. 4–8, that operation of the windshield washer is permitted even more quickly than is true of the form of the invention shown in FIGS. 1–3. This is by reason of the fact that even before the engine is started, the liquid within the chamber 49, surrounding the coil 64, is already hot by reason of the presence of the electrical heating element 80 in the chamber. As a result, there is a supply of hot windshield washer fluid available immediately upon starting of the engine, even before circulation of hot engine coolant induced by operation of the water pump 99. Of course, at the time the engine is to be started, the plug 88 is pulled, so that thereafter, the windshield washer fluid is heated by heat exchange with the coil 64 as engine coolant is pumped through the chamber 49.

In both forms of the invention, the device is very swiftly and easily installed. In the first form, the existing windshield washer fluid supply hose and the space heater supply hose, if in close proximity to each other, need only be cut, and the cut ends can then be readily attached to the coolant inlet and outlet 24, 26, and to the coil inlet and outlet 36, 42 respectively. If necessary, of course, extension hoses can be readily and easily attached should installation conditions make this necessary.

In the second form of the invention, it is desirable that the device be mounted below the engine block, to assure the most efficient thermal circulation possible. To this end, T-fittings as described above may be appropriate, to permit connection of hoses 116, 118 between the device and the hoses 102, 98 respectively. Again, the washer fluid supply line need only be cut and the cut ends connected to the coil inlet and outlet 66, 68 respectively.

The invention has the desirable characteristic that in both forms, the windshield washer coil is totally immersed in the chamber through which the engine coolant flows, with a maximum amount of surface area of the coil exposed to the engine coolant, thus promoting maximum heat transfer to the windshield washer fluid confined within or passing through the washer fluid heating coil. In the second form of the invention, there is the added benefit that the windshield washer fluid heating coil is in close proximity to the electrical heating element 80 that is provided for the purpose of heating the engine while it is not running. As a result, with both the heating element 80 and the coil 64 immersed in closely spaced relation in the same body of fluid in a common chamber 49, the windshield washer fluid will be kept in a fully heated condition, awaiting use of the windshield washer. As soon as the heater 80 is de-energized, and the engine is started, heated windshield washer fluid will already be available for the purpose of spraying onto the windshield as the vehicle is placed in operation. Further operation of the windshield washer, with heated fluid, is almost immediately available thereafter, of course, because when the vehicle engine is placed in operation the engine coolant itself will be rapidly heated and will transfer its heat to the coil 64.

While particular embodiments of this invention have been shown in the drawings and described above, it will be apparent, that many changes may be made in the form, arrangement and positioning of the various elements of the combination. In consideration thereof it should be understood that preferred embodiments of this invention disclosed herein are intended to be illustrative only and not intended to limit the scope of the invention.

We claim:

1. The combination, with an internal combustion engine having a cooling system and including a block of the type through which a liquid coolant is circulated during operation of said system, said block having upper and lower ends, a radiator mounted adjacent the block and also having upper and lower ends, a radiator inlet hose extending from the upper end of the block to the upper end of the radiator, a pump for circulating coolant through the block, a radiator outlet hose extending from the lower end of the radiator to the coolant pump, a passenger space heater, a space heater supply hose extending from the block to the space heater, a return hose extending from the space heater to the pump, and a windshield washer system including a washer fluid reservoir, washer fluid nozzle means, and a washer fluid supply line having inlet and outlet end portions connected to the reservoir and nozzle means respectively, of a device for warming the engine and pre-warming the washer fluid when the engine is not running, and for also warming said washer fluid when the engine is running, comprising:

(a) a housing having a heating chamber and having an inlet and an outlet connected in communication with said chamber, the housing inlet and outlet being connected in communication with the radiator outlet hose and space heater supply hose, respectively, thus to connect the chamber in the cooling system as part of the flow path of coolant circulated through the system and thereby fill the chamber with the circulated coolant;

(b) a tubular conduit means for windshield washer fluid, supported within the chamber in position to be substantially wholly immersed in the coolant filling the chamber, whereby to heat the washer fluid by the transfer of heat from the circulated coolant to the washer fluid through the wall of the conduit, said conduit means including inflow and outflow ends projecting exteriorly of the chamber and respectively connected to the inlet and outlet end portions of the windshield washer fluid supply line to provide a heated supply of washer fluid for the spray head; and (c) heating means within the chamber for elevating the temperature of the coolant and the washer fluid therein, said heating means comprising an electrical heating element wholly immersed in the coolant within the chamber in laterally spaced relation to the conduit means and adapted for connection to a supply of house current, whereby the heater means when energized will be in heat-exchange relation to and will warm the coolant to initiate flow thereof by thermal circulation when the engine is not running, from the housing to the space heater supply hose and into the upper end of the block, and thereafter downwardly through the block to the lower end thereof to displace and force upwardly coolant that is of a lower temperature, whereby to cause the same to exit the block through the radiator outlet hose and thereafter return to the housing through the connection between the radiator outlet hose and the housing inlet.

2. In a device for warming an internal combustion engine by a reverse, thermal circulation of an engine coolant during periods of time when the engine is not running, the combination, with a cooling system including a block through which, when the engine is in operation, a liquid coolant is normally circulated in a closed path by a pump from an outlet located at the upper end of the block through a radiator and back into the block via a radiator outlet line to flow upwardly in the block back to the outlet, and is also circulated by the pump from the upper end of the block through a space heater supply line to a space heater and back into the block through the pump, of:

(a) a housing mounted exteriorly of the block and having a flow-through heating chamber for the coolant, said housing having an inlet and an outlet that are in communication with the chamber and have lines connecting them to the radiator outlet and the space heater supply lines respectively; and (b) means immersed in the chamber for heating the coolant flowing therethrough to induce thermal circulation of the coolant, when the engine and pump are not running, through the line connecting the chamber to the space heater supply line and thereafter through the space heater supply line in a direction reversed from the normal flow therethrough and on to the engine block coolant outlet at the upper end of the block, for gravitational flow of the coolant through the block to the lower end thereof, so as to displace coolant from the lower end of the block and cause the same to flow out of the block through the block inlet in a direction reversed from the normal flow of the coolant when the engine is running, and from there back to the chamber inlet through the radiator outlet line and the connection between the radiator outlet line and the chamber inlet.

3. In a device that operates, when an internal combustion engine is not running, to induce a reverse, thermal circulation of an engine coolant and also pre-warm a windshield washer fluid, and that further assures a supply of warm washer fluid when the engine is running, the combination, with a cooling system including a block through which, when the engine is in operation, a liquid coolant is normally circulated in a closed path by a pump from an outlet located at the upper end of the block through a radiator and back into the block via a radiator outlet line to flow upwardly in the block back to the outlet, and is also circulated by the pump from the upper end of the block through a space heater supply line to a space heater and back into the block through the pump, of:

(a) a housing mounted exteriorly of the block and having a flow-through heating chamber for the coolant, said housing having an inlet and an outlet that are in communication with the chamber and have lines connecting them to the radiator outlet and the space heater supply lines respectively;

(b) means immersed in the chamber for heating the coolant flowing therethrough to induce thermal circulation of the coolant, when the engine and pump are not running, through the line connecting the chamber to the space heater supply line and thereafter through the space heater supply line in a direction reversed from the normal flow therethrough and on to the engine block coolant outlet at the upper end of the block, for gravitational flow of the coolant through the block to the lower end thereof, so as to displace coolant from the lower end of the block and cause the same to flow out of the block through the block inlet in a direction reversed from the normal flow of the coolant when the engine is running, and from there back to the chamber inlet through the radiator outlet line and the connection between the radiator outlet line and the chamber inlet;

(c) a windshield washer fluid heat transfer conduit extending within said chamber in heat exchange relation to the coolant flowing therethrough;

(d) a washer fluid supply line extending from the reservoir to one end of said conduit; and (e) a washer fluid discharge line extending from the other end of the conduit to the washer spray nozzle whereby to assure a continuously warmed supply of washer fluid to said spray nozzle.

* * * * *